FIG. 3.

H. D. DAVIS.
Looms.

No. 141,262. Patented July 29, 1873.

WITNESSES.
Albert E. Downs
S. A. Wood

INVENTOR.
Hilas D Davis

UNITED STATES PATENT OFFICE.

HILAS D. DAVIS, OF NORTH ANDOVER, MASSACHUSETTS, ASSIGNOR TO GEORGE L. DAVIS, JOHN A. WILEY, JOSEPH M. STONE, GEORGE G. DAVIS, JOSEPH H. STONE, AND JAMES H. DAVIS, OF SAME PLACE.

IMPROVEMENT IN LOOMS.

Specification forming part of Letters Patent No. 141,262, dated July 29, 1873; application filed February 21, 1873.

*To all whom it may concern:*

Be it known that I, HILAS D. DAVIS, of North Andover, in the county of Essex and State of Massachusetts, have invented certain Improvements in Looms, of which the following is a specification:

My invention relates to the mechanism by which the shuttle-boxes may be operated automatically in looms in which several shuttles are used, and a part of said mechanism may also be used in connection with the mechanism which operates the heddles in fancy looms.

My first improvement relates more especially to the construction and operation of the pattern-chain and the mechanism with which it immediately co-operates as applied to determine the order in which either the shuttle-boxes or the leaves of heddles shall be operated; and consists in combining with the levers or their equivalents, which work upon the rollers or other pattern-surface of the pattern-chain, a mechanism which gives a motion toward and from the pattern-chain, so arranged in connection with the movement of the pattern-chain that the movement to change the chain will take place while the levers are moved away from the chain; and when the lever is moved toward the chain to change shuttle-box mechanism or the heddle mechanism, as the case may be, the working-surfaces of the chain serve only as fulcrums or stops to the levers, while the movement of the levers produces the required changes of the mechanism which they control, thus relieving the pattern-chain of the labor of moving the levers and the mechanism operated by them, when the chain is moved to change the shuttle-boxes or heddles, as has been the practice heretofore.

My second improvement relates to the mechanism for operating the pattern-chain, so that it may be operated at every pick, as is usual, or operated at intervals of two or more picks, as may be desired; and consists in combining, with the mechanism for operating the levers of the pattern-chain, and also with the mechanism for turning the pattern-chain, a cam or cams or their equivalent, which will operate them at the required intervals in any determined ratio to the beats of the lay; and it also consists in making said cam or cams with removable inclines, by which the said operations may be varied, as will be described.

My third improvement relates to the mechanism for operating the cranks or eccentrics by which the shuttle-boxes are moved and held at rest; and consists of several peculiarities in the construction of the devices in combination with said cranks or eccentrics, which will be described.

My fourth improvement relates to mechanism for connecting and operating the shuttle-boxes, which will be described.

In the drawings only so much of the loom is represented as will serve to show the nature and application of my improvements thereto.

Figs. 19, 20, 21, 22 are drawn to a scale of twice the size of the other.

Figure 1:
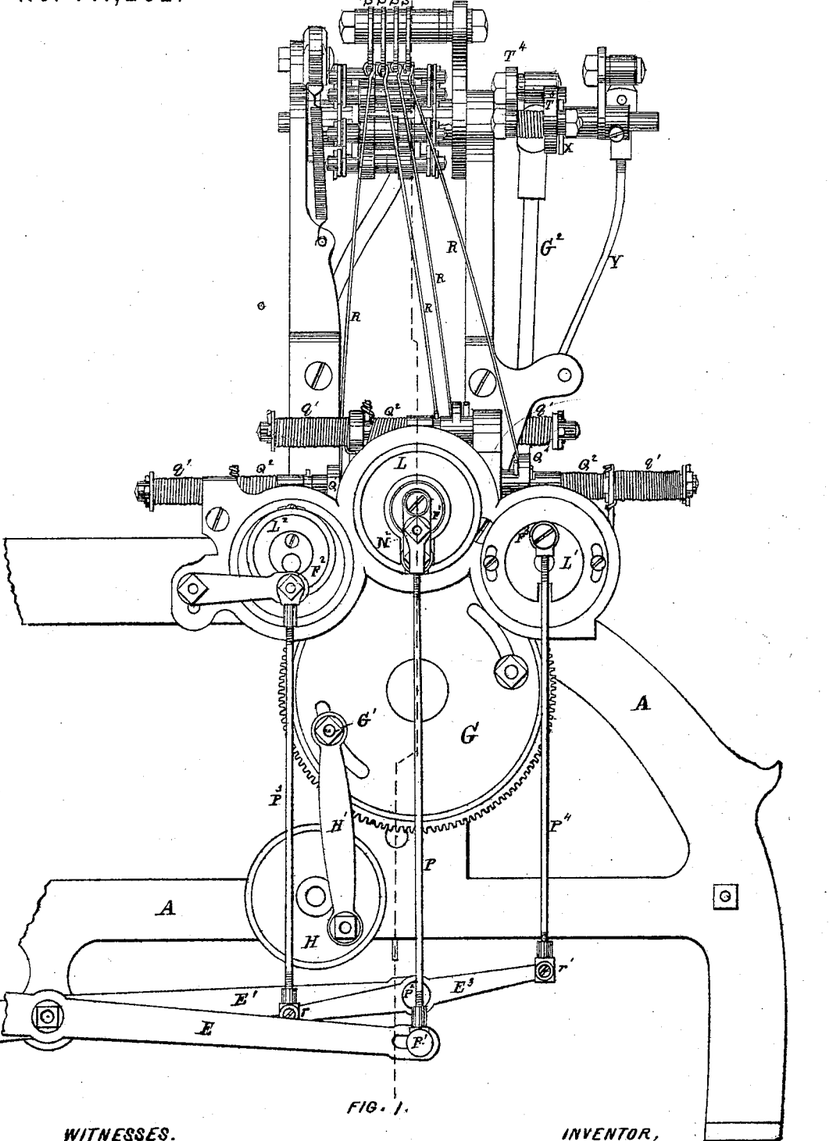
Figure 1 represents, in elevation, a part of my improved mechanism, looking from the outside of the loom.
Figure 2:
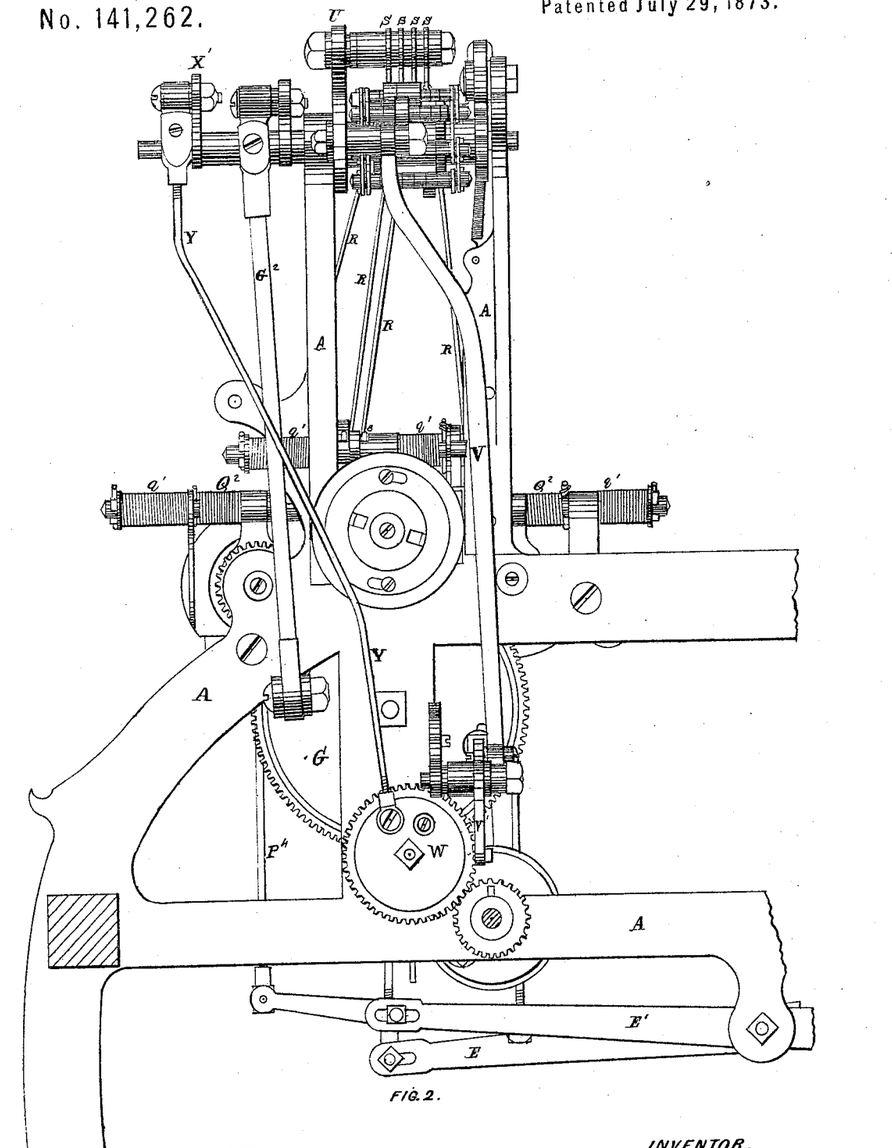
Fig. 2 is an elevation of the same, looking from the inside of the loom.
Figure 3:
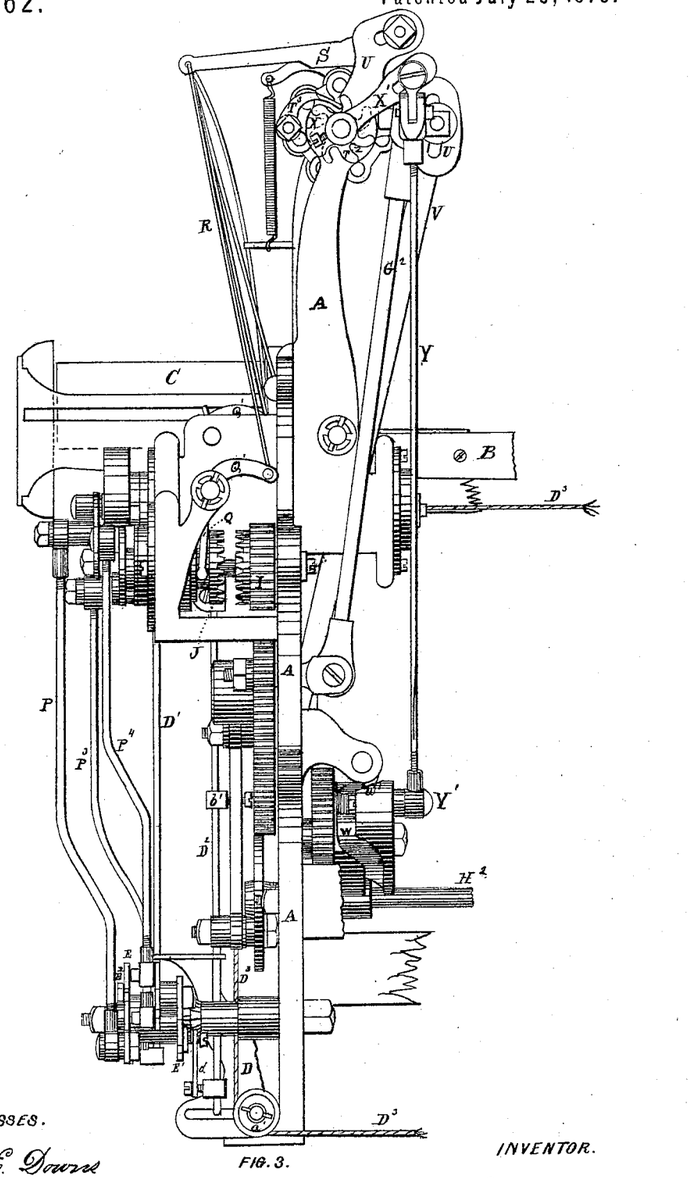
Fig. 3 is an elevation of the same, looking toward the lay.
Figures 4, 8:
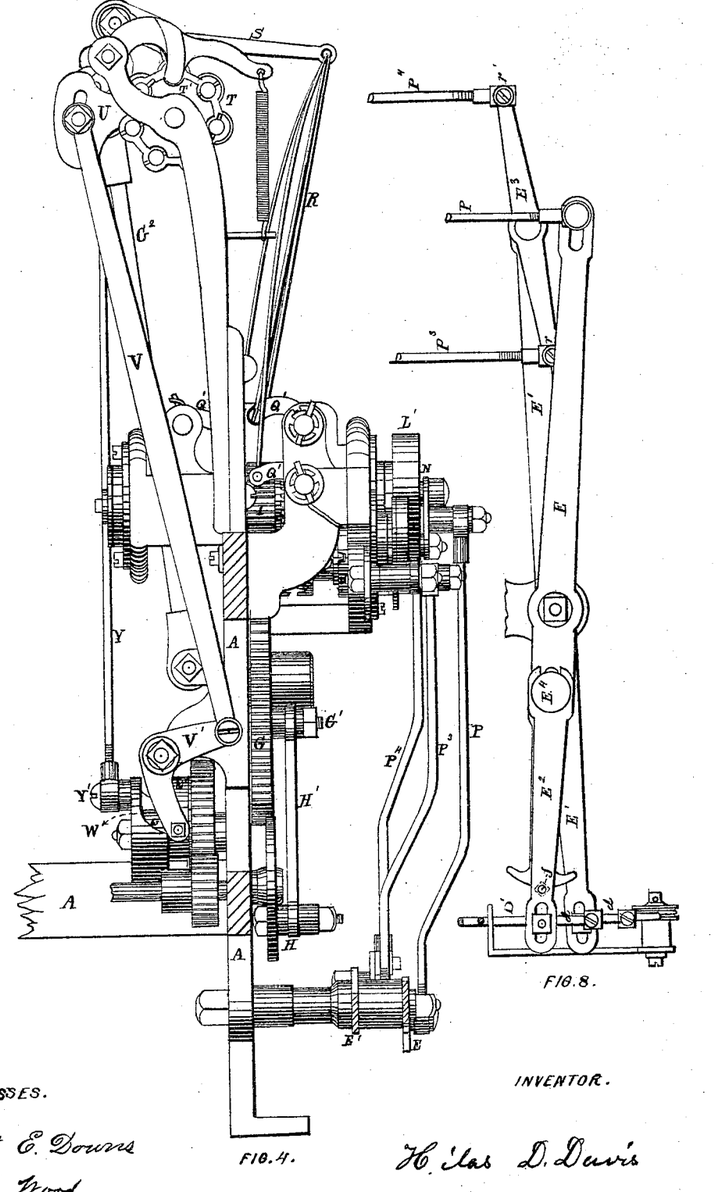
Fig. 4 is an elevation of the same, looking in an opposite direction.
Fig. 8 is a separate view of the shuttle-box levers.
Figures 5, 19, 20, 21, 22, 23, 24, 25, 26, 27, 28, 29, 30:
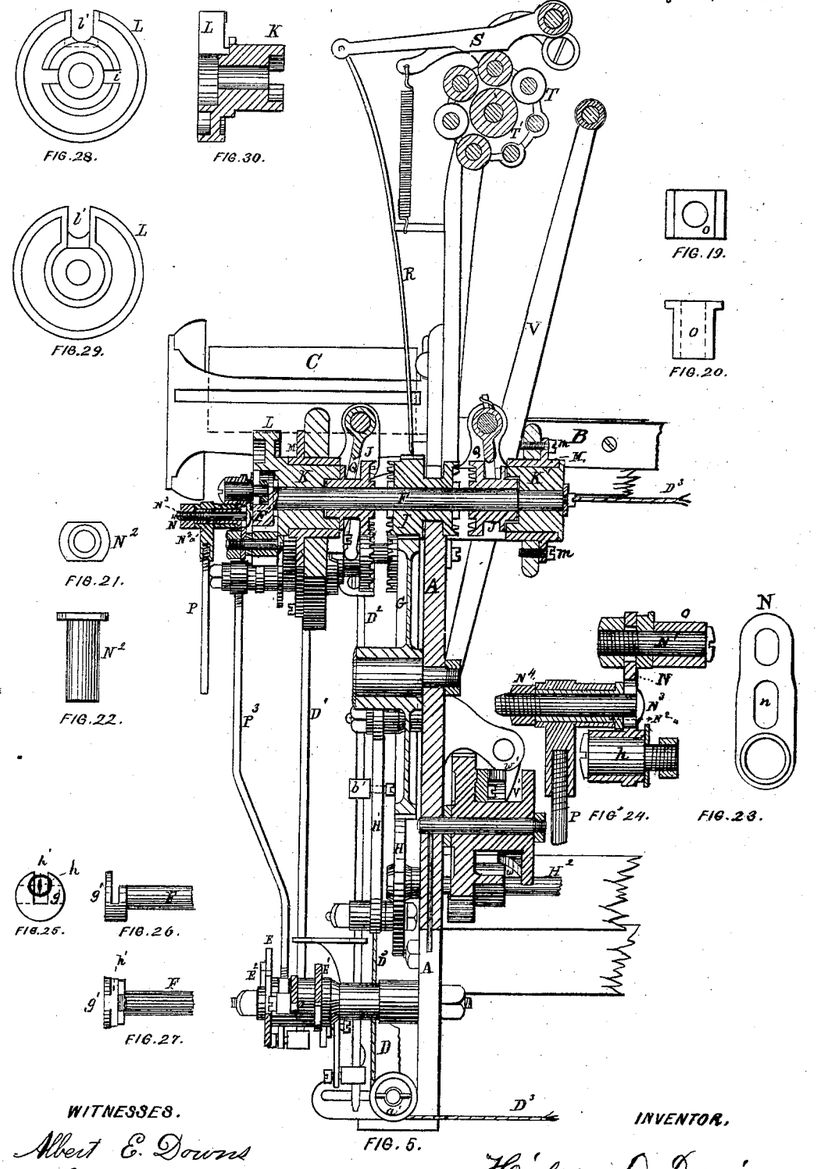
Fig. 5 is a vertical sectional elevation of the same through the middle shaft F.
Figs. 9 to 25 are separate views of details, which will be referred to in the description.
Figures 6, 9, 10, 11, 12, 13, 14, 15, 16, 17, 18:
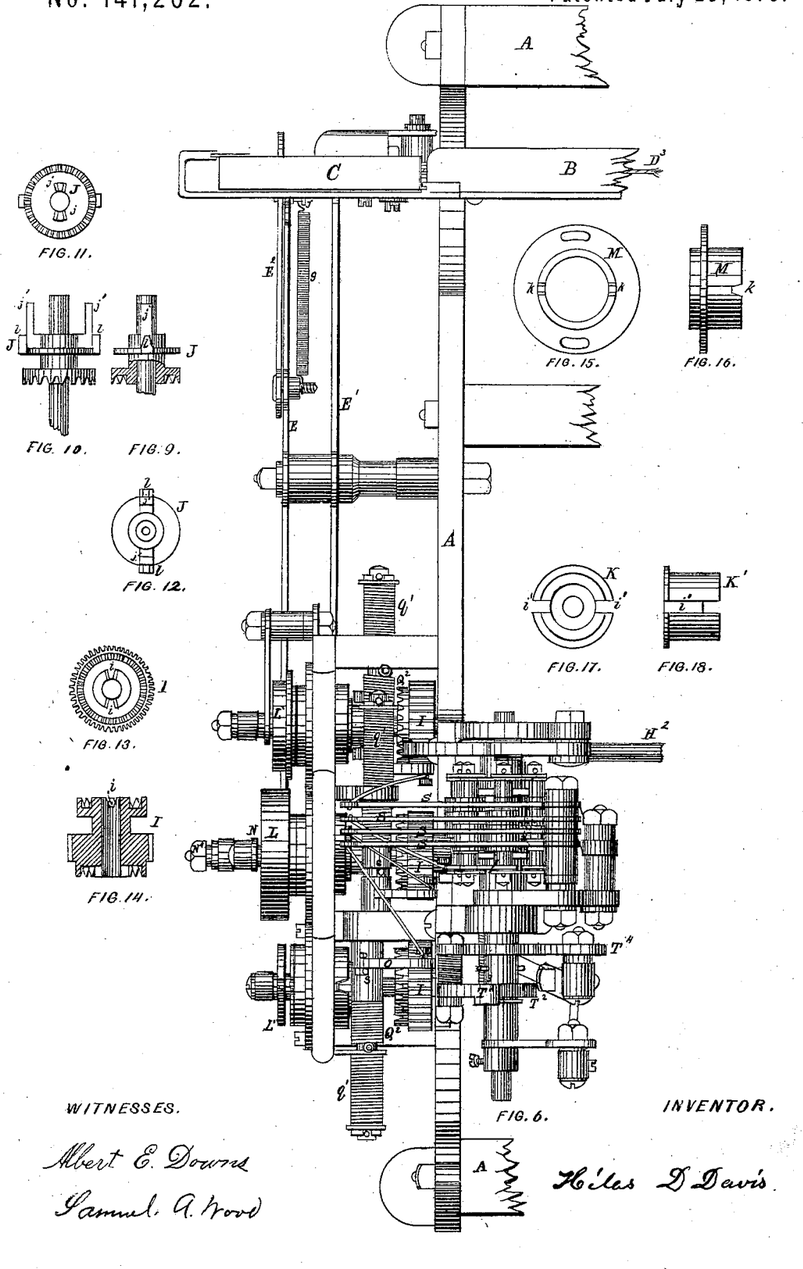
Fig. 6 is a plan.
Figure 7:
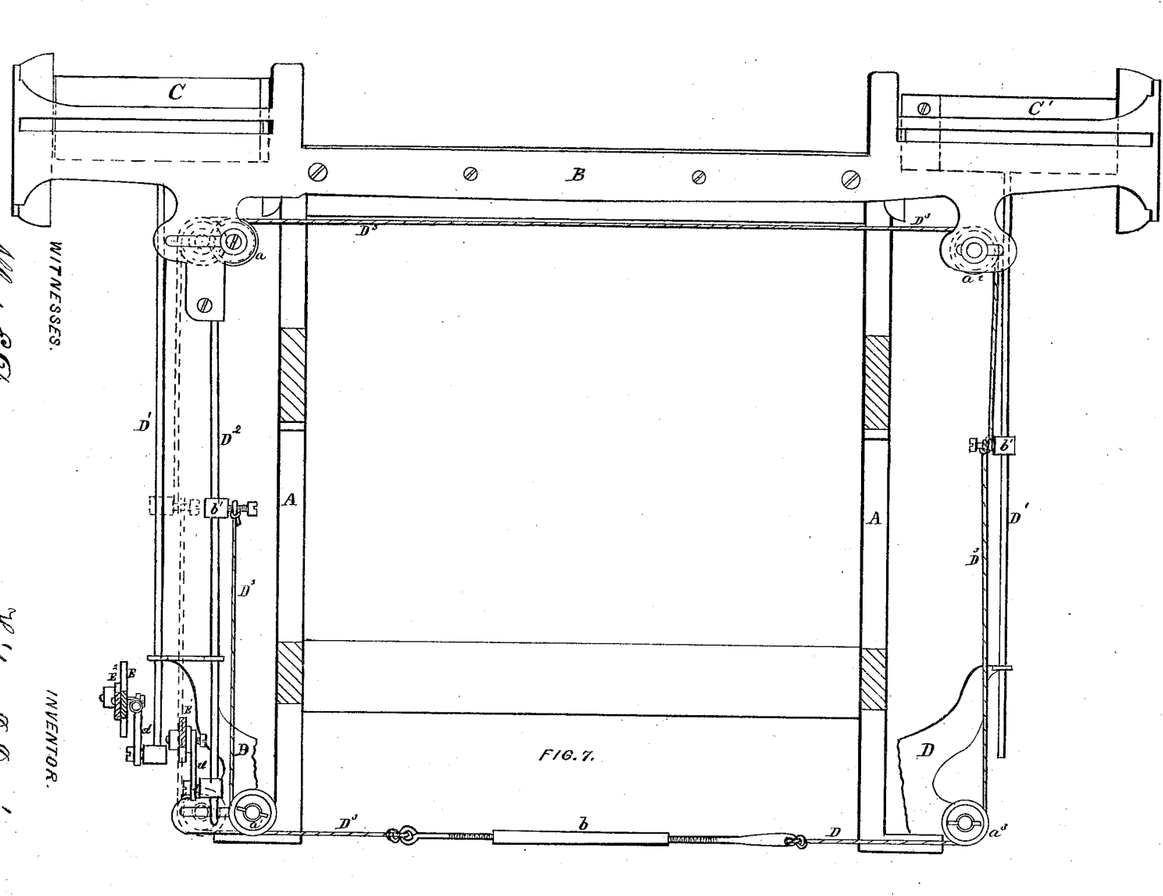
Fig. 7 is an elevation of the attachments to the lay and shuttle-boxes.

A is the frame of the loom; B, the lay, a portion only of which is shown, sufficient to show the application of my improvements to it. The brackets D, shown broken in Fig. 7, which guide the lower ends of the rods $D^1$ and $D^2$ are supposed to be attached to the swords of the lay, which are not shown. C $C^1$ are the shuttle-boxes, which work in guides vertically in the lay in the usual way, and in this case each series is supposed to contain three boxes. They are attached to the tops of the rods $D^1$, as usual. The shuttle-boxes, as represented by the full lines of the drawing, work independently of each other, and each series of boxes is provided with a separate mechanism for operating it, to be described. E E, Fig. 8, are the levers which move the shuttle-boxes, and they are connected with the rods $D^1$ by links $d$, as usual. Upon the lever E is shown a device for preventing the mechanism from being broken in case it is attempted to change the boxes when the shuttle is not entirely within the box, or the boxes or their mechanism are in some way prevented from moving. For this purpose the lever E carries upon its outer end a secondary lever, $E^2$, with which the rod $D^1$ is connected, which has its inner end slotted, and works upon a fulcrum-pin, $E^4$, fixed in the lever, and its outer end is held in a fixed position on the lever by the stud $f$, which is fixed in the piece $E^2$, and is held in a V-shaped notch in the circular end of the lever E by the spring $g$, as is seen in Figs. 6 and 8, so that when any extraordinary resistance is made to the movement of the shuttle-box the stud $f$ yields and is forced out of the notch by the strain, and allows the lever E to move without moving the box, while at the same time the stud $f$ is held in its notch with sufficient firmness to resist the strain imposed upon it in its usual operations, and the lever E acts as though made in one piece. In the drawings this safety device is shown as applied to the lever E only, but it may also be applied to the other lever $E^1$ when two levers are used. The power to operate the box $C^1$ upon the opposite side of the loom is transmitted to it from the rod $D^2$ to the rod $D^1$ by the chain $D^3$, which is attached to each rod as shown, and is led over the sheaves $a$ $a^1$ $a^2$ $a^3$, which are attached to the lay. The chain is kept taut, and the wearing is provided for by the turn-buckle $b$, as shown, and the vertical adjustments of the boxes is provided for by the blocks $b'$, to which the ends of the chain are attached, which slide upon the rods $D^1$, and are held fixed by set-screws. If it is desired to work the two series of shuttle-boxes in connection, one lever, E, only is used, and the chain $D^3$ is attached at that end to the rod $D^1$, as is shown by the dotted lines in Fig. 7, and the other lever and system of mechanism by which it is operated are omitted. In this case the boxes counterpoise each other. The levers E and $E^1$ are worked by the cranks or eccentrics $F^1$ $F^2$ $F^3$, shown under three modifications of form, but embodying the same principle of giving a positive motion to the levers and shuttle-boxes by a crank or cranks, which are also, by a positively-controlled motion, made to revolve a half revolution at a time, and to be held in an accurately-fixed position while not revolving. These cranks are arranged in an arc of a circle, so as to be all driven by the gear G, which has a reciprocating revolution through an arc of a circle just sufficient to give a half a revolution to the cranks. The reciprocating rotation of the gear G is given by the crank H and connecting-rod $H^1$ which works upon an adjustable crank-pin, $G^1$, by which the extent and limits of movement of the gear G and cranks may be accurately determined. The revolution of the crank H coincides with the beats of the lay, and the amount of its throw is sufficient to give exactly a half revolution to the pinions I, by which the several cranks $F^1$ $F^2$ $F^3$ are rotated. J J J are clutches by which the cranks are rotated. They are provided with beveled teeth entirely around the circumference, which interlock with corresponding teeth upon the pinions I. The clutches detached are shown in Figs. 9, 10, 11, and 12; and the pinion on shaft F, which operates two clutches, is shown in Figs. 13 and 14. The two other pinions operate but one clutch each, as is shown. Upon the face of the clutches J, and within the circle of the teeth, are two beveled teeth, $j$, Fig. 11, the points of which project a little beyond the circle of teeth; and upon each pinion I there is a boss which surrounds the shaft, and in its face are formed two beveled notches, $i$, Fig. 13, to receive the teeth $j$. The purpose of these is to prevent the clutches from engaging except at two points in the circumference one hundred and eighty degrees apart, which correspond to the two dead-points of the cranks. The opposite ends of the clutch are provided with two slides, $j'$, upon opposite sides of the center, as seen in Figs. 9, 10, 11, 12, which work in two grooves, $i'$, in opposite sides of the socket K, as are seen in Figs. 17 and 18. These sockets K are connected with the cranks, and serve to turn them. The shaft F, which works with a double crank, has a socket, $K'$, on its inner end and fastened upon it; but it passes loosely through the outer socket K, which is formed in one piece with the crank-disk L, shown separately in Figs. 28, 29, 30, or with the crank-disk $L^1$ or eccentric-cam $L^2$, as the case may be. The exterior of the sockets K are cylindrical, and rotate in the cylindrical bushings M, which are severally made adjustable circumferentially, and held fixed by the screws $m$. Upon the inside of these bushings are made two beveled notches, $k$, upon opposite sides, which receive two corresponding beveled teeth, $l$, upon the clutch when it is thrown back or disengaged. The purpose of the circular adjustment of the bushings M is to hold the clutches accurately, so that they will be in a position to engage with the clutch-teeth on the gears I, when they are at their limit of motion. The double crank $F^1$ is of a peculiar construction, and is shown in section in Fig. 5. It has a crank, $g'$, formed upon the outer end of the shaft, of the form shown in Figs. 25, 26, 27, which carries a crank-pin, $h$, which is adjustable radially in the slot $h'$. Upon this crank-pin, as an axis, the radial bar N rotates, which is shown on a larger scale in Fig. 23, and in section, in connection with other parts, in Fig. 24. This bar carries, at its outer end, a wrist-pin, $N^1$, upon which is mounted the sliding block $o$, seen separately in Figs. 19 and 20, which works in the slot $l'$ of the crank-disk L, seen separately in three views in Figs. 28, 29, and 30. The bar N also carries the hollow crank-pin $N^2$, shown separately in Figs. 21 and 22, which is fixed upon the bar by the bolt $N^3$, which passes axially through it and through the slot $n$ in the bar, and by which the pin can be adjusted radially in the slot by loosening the nut $N^4$ upon the outer end of the bolt. Upon the crank-pin $N^2$ the butt-end of the connecting-rod P works, the lower end of which works upon a wrist, $P^1$, in the end of the shuttle-box lever E. The radial adjustment of the crank-pins is a matter of much importance in this connection, to enable the motion imparted by the cranks to be accurately adapted to the distance between the several shuttle-boxes in each series, which is difficult to be done without some means of adjustment after the parts are made. Now, the throw of each of these cranks is just sufficient to move the boxes one grade, so that, by their joint or separate action, the boxes may be moved either one or two grades, as may be desired. The other cranks, $F^2$ and $F^3$, are operated in the same way as the double crank $F^1$, excepting that they are single cranks, and require but one clutch with its accessories for each. These two cranks operate the lever $E^1$ through the secondary lever $E^3$, which has its fulcrum upon a wrist, $P^2$, in the end of the same, and at each end receives the connecting-rods $P^3$ and $P^4$, which work upon the wrists $r$ $r'$, respectively. These two last-named movements are sufficient to move the boxes two grades, one-half of which movement only is imparted to the boxes when only one of the cranks is moved, by reason of the action of the secondary lever $E^2$. The wrist $N^1$ is also adjustable radially in the disk $L^1$, to determine the extent of the movement to be imparted by it. The clutches J are worked by the shipping-levers Q Q, &c., each having its axis placed above, and upon each of which is also arranged the horizontal arms $Q^1$ $Q^1$, &c., to each of which a rod or chain, R, is attached, which connects it with the outer end of one of the pattern-levers S, which work upon the bolls of the pattern-chain T, which is made in the usual manner. The horizontal arms $Q^1$ $Q^1$, &c., of the shipping-levers Q Q, &c., rotate loosely upon their axes, and they are held in a fixed relation to the other arms Q by the springs $Q^2$, which are coiled around their axes, one end of each of which is made fast to the axis, and the other end to the arm $Q^1$, and by its tension holds the arm against the stop $s$ in the other arm of the lever in a fixed relation to it. The purpose of this construction is to relieve the strain and avoid breaking the machinery in case the teeth of the clutches should abut against each other and not properly interlock. The axes of the levers S are not fixed, as is usual, but are attached to the vibrating bracket U, which moves the levers toward and from the pattern-chain, and is itself worked by the rod V and bent lever $V'$ from the cam W. The cam W is driven by gears at one-half the velocity of the crank-shaft $H^2$, and the cam-groove is provided with two sets of inclines, $w$ $w'$. (See Fig. 4.) The inclines occupy but a small portion of the circumference, and the rest of the groove holds the bracket U at rest, either in a raised or lowered position. The inclines are so set, in relation to the crank H, that they act upon the bracket U, and give motion up or down to the levers S, just as the crank arrives at its dead-points and the gears G and I are at their limit of motion. This rising and falling of the axes of the levers S enables the pattern-chain to be turned with freedom when the levers are raised, and when they descend such of them as encounter the bolls of the chain are arrested, and the boll becomes a fulcrum to the lever, and the further descent of its axis raises the outer end of the levers, and throws the clutches J into engagement with the gears I by the devices described in an obvious manner. When the axes of the levers are moved in an opposite direction by the cam W, the clutches J are drawn out of engagement with the gears and into engagement with the bushings M, as has been described, by the springs $q'$, which are coiled around the axes of the shipping-levers Q, as is shown. The wheel $T^1$, which carries the pattern-chain, is constructed in the usual way, and is driven by a ratchet, $T^2$, and pawl $T^3$, upon the lever $T^4$, by the rod $G^2$, from the reciprocating gear G, as is shown.

When it is desired to work the shuttle two picks for each movement of the chain, the machinery is modified as follows: One of the inclines, $w'$, which is made separate, is removed from the cam W, and the vibrating cam X, which is mounted upon the shaft of the wheel $T^1$, is slipped along upon the shaft against the side of the ratchet $T^2$, so that its periphery comes beneath the pawl $T^3$, and when rotated forward covers the notch of the ratchet behind the pawl, and holds it out of the notch until the cam X vibrates back at the next pick. The cam has an arm, $X'$, extending inward, which, by the connecting-rod Y, is worked by a wrist-pin, $Y'$, in the cam W, as is shown. As the cam W revolves once in two picks, at every other pick the cam X rotates forward, and prevents the pawl from acting, and the chain from being changed.

When it is desired to work the chain at every pick, the cam X is slipped along the shaft away from the ratchet, when the pawl operates at every pick, and the removed incline of the cam W is replaced.

It is obvious that the devices for embodying the several modes of operation herein described may be much varied; and parts of the same may be usefully employed without using the whole—as, for instance, the mode of operating the pattern-levers in combination with the pattern-chains may be applied to other mechanisms for moving the shuttle-boxes with the same beneficial result; and, also, applied to the mechanism for working heddles when their selection is controlled by a pattern-chain. So the mode of operation of rotating the cranks or eccentrics or cams, by clutching the same at intervals to a reciprocating device to rotate them, and to a fixed stop to hold them at rest, with the corresponding devices, or their equivalents, to carry out this mode of operation, may be applied to other mechanism for moving the shuttle-boxes with the same beneficial result; but the devices shown are such as I have tried with success, and I have, therefore, shown them as an embodiment of my invention.

What I claim is—

1. The combination of the levers, or their equivalent, which work upon the pattern-chain of mechanism for imparting a vibratory motion to said levers toward and from the pattern-chain, by which motion the chain controls the movements of the shuttle-boxes or the heddles, substantially as described.

2. The combination, with the said levers, or their equivalent, and the mechanism for imparting the vibratory motion to them, as described, the mechanism shown, or its equivalent, so arranged as to suspend such vibration for one or more picks, substantially as described.

3. The combination, with the ratchet and pawl for revolving the pattern-chain, of the cam X upon the shaft thereof, to suspend the movements of the pattern-chain for one or more picks, substantially as described.

4. The sliding clutch J, for rotating the cranks, in combination with the reciprocating rotating clutch I, to impart a measured rotation to the cranks, substantially as described.

5. The clutch J, in combination with the fixed stops or bushings M for holding the cranks in a fixed position, substantially as described.

6. The bushings M, provided with means for circular adjustment, in combination with the clutch, substantially as described.

7. The teeth or blocks $j$, and the corresponding recesses $i$, in combination with the toothed clutches, to prevent their engagement except at certain determined points, substantially as described.

8. The combination of the two arms Q and $Q^1$ of the shipping device with a yielding-spring connection to prevent the breaking of the mechanism, substantially as described.

9. The combination of the shipping-lever of the clutch with the vibrating pattern-lever S, substantially as described.

10. The combination of one or more continuously-reciprocating rotating clutches, having a measured circular motion, with one or more clutches which are made to engage with and disengage from the same at or near the limits of said motion, as a device for imparting an intermittent measured rotation to the cranks that move the shuttle-boxes, or to other mechanism, substantially as described.

11. The combination of the secondary sliding lever $E^2$ with the shuttle-box lever E, by means of the yielding catch $f$, substantially as described.

12. The chain $D^3$, in combination with the shuttle boxes and rods $D^1$ and $D^2$, or rods $D^1$ $D^1$, upon opposite sides of the loom, so as to give the boxes a positive motion in both directions, substantially as described.

13. The double crank for moving the shuttle-boxes, consisting, substantially, of the inner crank, the radial bar with its wrist-pin, which revolves upon the wrist-pin of the crank, and the slotted disk which revolves said bar, combined and operating substantially as described.

HILAS D. DAVIS.

Witnesses:
ALBERT E. DOWNS,
S. A. WOOD.